May 23, 1972     L. J. BARR'E     3,664,709
DUAL WHEEL ADAPTOR SYSTEM
Filed May 6, 1970     3 Sheets-Sheet 1
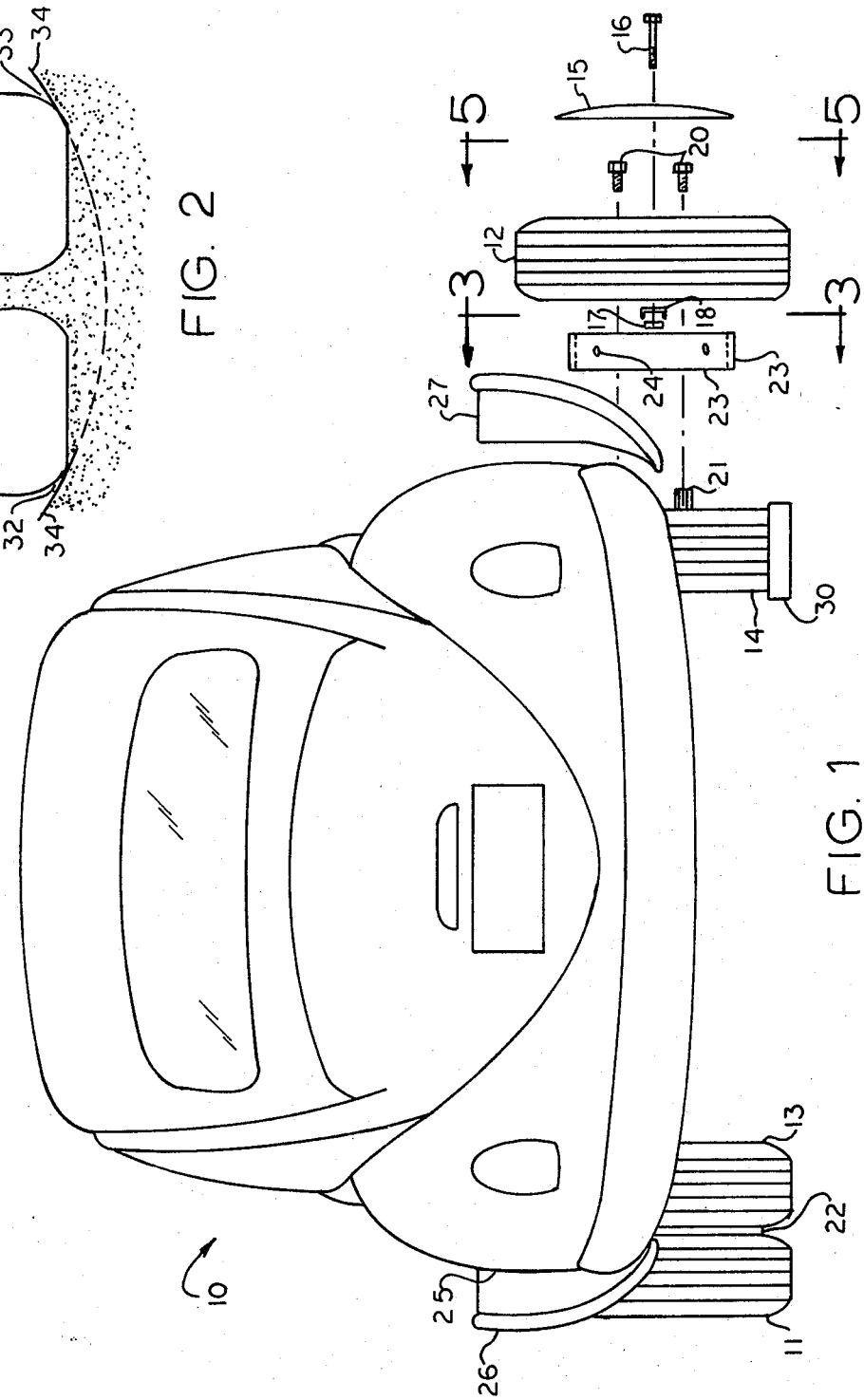
INVENTOR.
LESTER J. BARR'E
BY
*George E. Pearson*
ATTORNEY May 23, 1972  L. J. BARR'E  3,664,709
DUAL WHEEL ADAPTOR SYSTEM
Filed May 6, 1970  3 Sheets-Sheet 2

INVENTOR.
LESTER J. BARR'E
BY
ATTORNEY

INVENTOR.
LESTER J. BARR'E

BY

ATTORNEY

United States Patent Office 3,664,709
Patented May 23, 1972

3,664,709
DUAL WHEEL ADAPTOR SYSTEM
Lester J. Barr'e, 2302 Shelter Island Drive,
San Diego, Calif. 92106
Filed May 6, 1970, Ser. No. 35,156
Int. Cl. B60b 11/02
U.S. Cl. 301—36 R                    7 Claims

ABSTRACT OF THE DISCLOSURE

A dual wheel adaptor system for single tire vehicles uses stock wheels and fasteners to clamp an open ended torque ring between the confronting rim peripheries of the dual wheels on each side of the vehicle.

The edges of the torque ring are rounded to interfit with the radii of the engaged peripheries so that radially directed spring and clamping forces produce both frictional interlocking and concentric alignment of the inner and outer wheels resulting in a unitary drive, dual wheel traction unit.

Auxiliary fenders are added, as required.

BACKGROUND OF THE INVENTION

This invention relates generally to dual traction wheel units and more particularly to a wheel adaptor system for adding duals to single wheel type single tire vehicles such as the family car, campers, pickups, and the like.

Duals are used extensively on heavy duty trucks, and their effectiveness for the purpose is well established. The current use of wide rims and low profile tires on pickups, campers, and farm equipment is also fairly well established to provide safer, smoother driving, as well as greater stability, increased load capacity, longer tire life, improved braking, and other features and advantages which enhance the roadability of the vehicle.

The so-called wide ovals, slicks, or wide tires are also widely used on sporting type vehicles such as dune and snow buggies to provide traction and directional stability over sand and snow terrain. The "slicks" when used on sports cars and other passenger cars, not only provide a status symbol for the user, but enable him in stuntsmanlike fashion to perform such sensational maneuvers as "cornering" and "laying down a scratch."

The advantages and reason for using duals on the family type passenger car are just as obvious and persuasive as when used on trucks and sport car types, as aforedescribed. Actually, the arguments for using duals on the family car are more persuasive. From the standpoint of safety alone, the extra tires provide a safety margin against blow outs, and the danger which haunts and stalks every tire change at or near the freeway is entirely eliminated insofar as the blow out of a rear tire is concerned since the remaining good tire on that side of the vehicle is fully capable of supporting the vehicle for transport to the destination, or to a garage, whichever is desired.

The duals on a family car provide increased traction, even when the tread on the tires is worn fairly smooth. Thus, their use eliminates the need for the so-called snow tires whose knobby, heavy tread otherwise becomes a near necessity from the standpoint of safety and maneuverability when passenger cars with singles are driven on icy roads and in deep snow. The heavy tread snow tires when driven on a smooth, clean road surface, however, provide a rough ride and unduly vibrate the vehicle.

Duals on the family car, moreover, not only provide two "in-use" spares as compared to the fifth wheel spare conventionally carried unused in the trunk compartment, but also increase the storage space on the vehicle. With the fifth wheel spare serving as one of the duals, the space vacated thereby in the trunk compartment becomes available for additional storage therein while, at the same time, the spare is available, if needed, to replace a flat front tire, for example, the vehicle thus being no less mobile from use of the conventional spare as a dual.

A most appealing reason for duals on a family type passenger car, however, is the "on-or-off" the highway capability which they give to such a vehicle whereby the family on an outing into the country, for example, or to the desert, or to the beach, or to the mountains, may leave the highway, and with the ease of a dune buggy, or a jeep, or a snow mobile, may proceed safely and effectively to an uncharted, no-road access type campsite, picnic area, or exploration site.

The use of duals on passenger cars, campers, pickups, and the like, has heretofore been proposed as in Patent No. 3,365,237 to Ernest C. Tillman and Patent No. 3,068,-049 to Marion S. Smith. Their use for such purpose, however, has not achieved any apparent degree of acceptance nor made any apparent impact on the motoring public. While various reasons may be advanced to account for this lack of impact, among the most significant might be mentioned the complexity of the prior art structural arrangements and installation methods employed to effect the single-to-dual adaptations or conversions, and the reluctance on the part of auto owners to replace manufacturer-approved stock parts with unproven, often non-factory-approved stock parts, or to make even minor modifications in the stock parts.

There is a longstanding and unfilled need therefore for a simple and effective adaptor wheel system for making the single-to-dual wheel conversions on passenger cars, pickups, campers, farm equipment, and the like vehicles.

SUMMARY OF THE INVENTION

In accordance with the present invention, the single-to-dual conversion is accomplished on passenger cars and other commercial vehicles by an adaptor system which utilizes the stock fasteners provided with the vehicle together with nut-stud adaptor extenders and an open-ended torque ring which makes advantageous use of the fact that the rim peripheries on the wheels of all conventional vehicles have the same radius, that is, the same curvature. The torque ring for variously sized wheels may thus be formed conveniently to various wheel diameters from linear lengths of extruded stock having, in cross section, rounded corners to interfit the radii of the rim peripheries.

In making an installation, a rear wheel is elevated by moving the vehicle to ride the wheel up on to a lift device such as a wedge, brick, flat stone, or the like. The stock fasteners are replaced by the nut-stud adaptor extenders without removing the wheel, and the torque ring is closed yieldably and snapped into position on the wheel rim periphery. A conventional, stock wheel and tire unit is now inverted, that is, the side which would normally face out to receive the hub cap is placed to face the wheel on the vehicle which will become the inner dual when the adaptation or conversion is completed. The inverted wheel is then moved onto the torque ring, and the replaced stock fasteners are now used in a conventional manner on the outer wheel to engage the nut-stud adaptor extenders and thus securely clamp the torque ring between the inner and outer wheels.

The torque ring is yieldably urged outwardly against the wheel rim peripheries by its inherent spring force, and will further be urged outwardly by centrifugal force as the speed of the vehicle increases. The torque ring is also urged laterally against the confronting wheel rim peripheries by the clamping forces developed by the fasteners as the wheels are secured together. These spring, centrifugal and clamping forces all act radially on the interfitting curved surfaces of the torque ring and rim peripheries with the result that the inner and outer wheels are frictionally locked together to provide a nonslip driving connection therebetween as well as to assure that the wheels are concentrically mounted with respect to each other. There is thus provided a unitary dual traction assembly in which the wheels work together as a unit, or in the event of a flat tire on either, the other effectively assumes the load separately and entirely by itself.

The outer wheel being inverted, its normal hub cap retaining devices, or surfaces, are not available to hold the hub cap in the normal manner, and means are therefore provided to secure the hub cap to the outer wheel.

The added wheels may project laterally from the rear sides of the vehicle to an extent prohibited by laws of certain states governing the movement of the vehicle on the freeways or other roadways. Accordingly, provision is made for adding auxiliary fenders, when these are required by law or preference of the car owner. A fender which satisfies this legal requirement, in practice, also serves at any forward speed of the vehicle to develop a rearwardly directed compressive force which not only moves tire pickup debris and spray backwardly and down to the road level, but also develops a pumping of tire cooling air through holes provided for the purpose in the torque ring.

Other features and advantages of the present invention will become more clearly apparent as the description proceeds with reference to the accompanying drawings.

BRIEF DESCRIPTION OF THE DRAWINGS

In the drawings:

FIG. 1 is a rear view of a passenger car having duals mounted thereon in accordance with the principles of the present invention and showing the wheel adaptor system in exploded fashion on one side of the vehicle;

FIG. 2 is a diagrammatic view illustrating the impaction of soft or loose ground surface materials between the dual tires;

Figure 3:
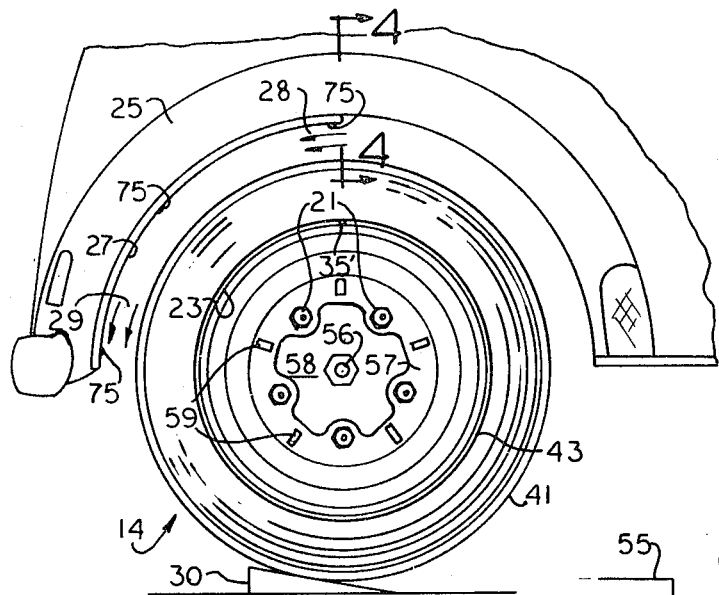
FIG. 3 is a rear side view of the vehicle as viewed substantially along the line 3—3 of FIG. 1, but showing the torque ring in place on the inner wheel rim periphery and the auxiliary fenders secured to the rear fender.

Referring now to the drawings and first more particularly to FIG. 1 thereof, there is shown thereon, a family type passenger car 10 which is equipped with duals in accordance with the principles of the present invention, the dual assembly on the right side being shown in exploded view fashion so that it may at once be seen what constitutes an adaptor assembly or kit and what is involved in a single-to-dual installation or conversion.

In considering first what constitutes an adaptor or conversion kit, assume that dual wheel 11 is the normal spare, that is, the fifth wheel which conventionally is carried, usually unused, in the trunk compartment of a car 10. Now going to the right side of the vehicle, wheel 12 is a stock wheel, just like spare 11, and constitutes a second spare, becoming the sixth wheel in the wheel system of the vehicle.

Spares 11 and 12, serving in their role as outer wheel duals, are inverted, that is, unlike their respective inner wheel counterparts 13 and 14, their normally outwardly facing hub cap receiving surfaces are turned to face inwardly toward the inner wheels, the inversion being preferential for technical reasons subsequently to be discussed. The rear wheel hub caps, of which cap 15 for the right side appears in FIG. 1, are mounted on outer wheels 11 and 12, respectively, suitable means such as the bolt 16, nut 17, and channelled cross bar 18 being used to secure the hub caps to their respective wheels.

The stock wheels fasteners 20, which normally secure the inner wheels 13 and 14 to their respective brake drums or wheel hubs, are removed and replaced by nut-stud adaptor extenders 21 which secure the wheels in the same manner as their replacements. As will subsequently appear with reference to other figures, the adaptor extenders 21 are made and shaped to perform the same functions normally provided by their replacements 20.

Outer dual wheels 11 and 12 are torque-coupled to their respective inner wheels 13 and 14 by torque rings 22 and 23 which are identical, that is, the same torque ring may be used on either side of the vehicle. As will appear in greater detail as the description proceeds, each torque ring is clamped between the confronting rim peripheries of the inner and outer wheels when the outer wheel is secured to the inner wheel by the replaced fasteners 20 which, for this purpose, engage the nut-stud adaptor extenders 21.

With reference again to dual 11, it will be seen that the same extends laterally beyond the outermost surface of the rear fender 25 of vehicle 10. To comply with certain laws, auxiliary fenders 26 and 27 may be required to cover the laterally extending portions of wheels 11 and 12. Whether or not the auxiliary fenders are required, it will be appreciated that the laterally extended tires provide rubber bumpers to protect the collision-vulnerable sides of the vehicle.

The primary purpose and function of the dual adaptor system is to torque-couple the outer wheel to the inner wheel so that the same are mounted and secured together concentrically and perform together as a traction unit. To accomplish this in accordance with the present invention requires the use only of the torque ring 23 and adaptor extenders 21. Thus, these members constitute the basic adaptor or conversion kit.

In a secondary sense, which has no bearing on the torque and traction function, the single-to-dual conversion may require the auxiliary hub cap holding elements 16 to 18, or their functional equivalent, when outer wheels 11 and 12 are inverted, as aforedescribed. Similarly, the auxiliary fenders 26 and 27 may be required. In this secondary sense, the adaptor kit for each side of the vehicle may also include cap holder elements 16 to 18 and auxiliary fender 26 or 27, as the case may be.

In considering now what constitutes a single-to-dual conversion, a rear wheel such as wheel 14 is elevated above the ground level by backing car 10 rearwardly up onto the wedge 30, FIGS. 1 and 3. Wedge 30 may be included as a part of the adaptor kit and carried along in the car for use when required. It will be understood, however, that any board, flat stone, or brick which might be found available for the purpose may be used as well as the wedge 30.

Wheel 14 is not removed in the conversion. As long as one adaptor extender 21 has been secured, as shown in FIG. 1, before the last fastener 20 has been removed from wheel 14, the wheel will not be disturbed with respect to its initial mounting on the wheel hub. When all of the fasteners 20 have been replaced by the adaptor extenders 21, torque ring 23 is seated in the rim periphery of wheel 14. Wheel 12 is then moved onto the torque ring, seating its rim periphery on the ring and rotating the wheel, as required, to align its fastener receiving holes with the adaptor extenders 21. Once aligned, the fasteners 20 are easily inserted into the fastener holes to engage the adaptor extenders to thus secure wheel 12 in the same manner as the wheels are secured to the vehicle in any other wheel mounting position thereon.

The torque rings 22 and 23 have a plurality of circumferentially spaced openings 24 therein, FIGS. 1, 7, 9 and 10, so that small stones, water and wheel pickup road debris may be driven centrifugally from the dual wheels through the openings 24 as the wheels rotate. These openings also function, in a pumping action, to provide for the flow of air therethrough and thence between the closely spaced tires to cool the same.

Torque rings 22 and 23 also function as backup surfaces as depicted schematically in FIG. 2 to cause loose or soft road surface materials such as sand, mud and snow to be compacted between the tires of the closely spaced wheels 11 and 13 to thus increase the traction developed by the duals unit 11, 13. The compaction is evidenced by the track which the duals leave behind in the soft surface, this track being characterized by an upstanding central web or rail corresponding in cross section to the impacted portion 31 depicted in FIG. 2. The edges of the track as depicted at 32 and 33, are rounded, tending to conform to the circular arc depicted by the numeral 34. Unlike the so-called wide ovals, slicks or wide tires which in a comparable loose, soft surface road condition would tend to dig a circular channel conforming in cross section to the arc 34, the dual system of the present invention not only produces a substantially flat track, but a track which includes the stabilizing center web or rail. When a hard road surface is reached and normal vehicle speed is resumed, the impacted material is thrown out from between the wheels by centrifugal force.

From the disclosure, particularly FIG. 1, it will be apparent that passenger car 10 is obviously a Volkswagen and that the duals adaptor system of the present invention is well suited for use therewith. Actually, in service use, a 1968 VW, as a test car, equipped with duals as disclosed in FIG. 1, was driven 20,000 miles under every conceivable driving condition including sand, snow, mud, and pacing the 1969 Baja 1000 road race. It will be understood, however, that whereas a Volkswagen has been disclosed for purposes of illustration herein, that the duals adaptor system of the present invention is also well suited for use with other vehicle such as different makes of passenger cars, campers, pickups, and light duty trucks, and that there are no known single drive vehicles upon which this duals adaptor system is not applicable.

Figure 10:
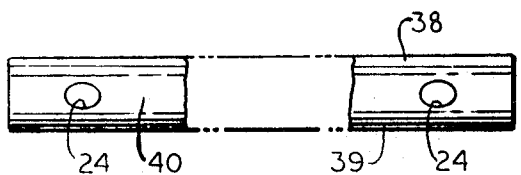
FIG. 10 shows a length of extrusion stock from which the torque ring of FIG. 9 is formed.
Figure 9:
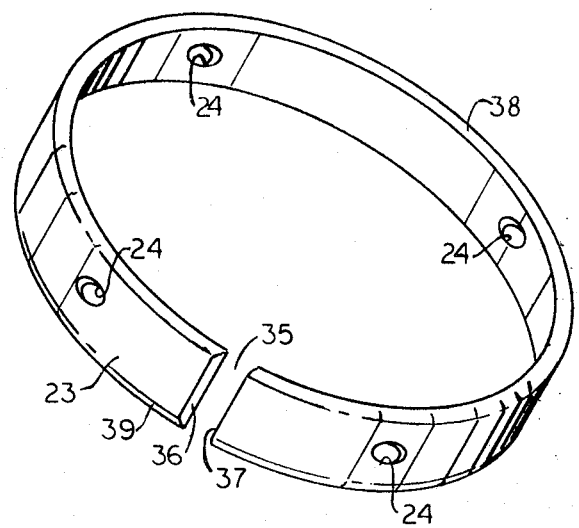
FIG. 9 is a perspective view of the torque ring.

Referring now with greater particularity to FIGS. 3 to 10 for a further understanding of the invention, it may bets be seen in FIG. 9, that the torque rings, such as torque ring 23, are formed open-ended, that is, there is a space 35 of about 1 inch intentionally left between the ends 36 and 37 of each ring when the same is formed, as by rolling, into a ring, as from the length of extrusion stock 40, FIG. 10. The aforementioned debris-passage and air flow openings 24 in the torque rings preferably are formed initially in the extrusion stock 40.

Stock 40 preferably is formed in suitable lengths as extrusions of aluminum which gives the open ended torque rings a predetermined degree of resiliency in relation to its cross sectional dimensions which typically are 2" to 2¾" by ⅜". The sides 38, 39 of each torque ring are rounded to a radius of curvature of the of ⅝" in the extrusion process of forming the stock material 40. As may best be seen in FIG. 8, the rounded sides 38, 39 of each torque ring conform to the radii, that is, interfit with the rounded confronting rim peripheries 45, 46 of the rims 43, 46 of the rims 43, 44 upon which are mounted the tires 41, 42 of the iner and outer wheels 14 and 12, respectively, FIGS. 1 and 7.

The rim peripheries of all passenger car wheels which have been observed, and there are no known exceptions, have the aforementioned radius of curvature of the order of ⅝". Hence, the rounding of the sides 38, 39 of the torque rings, i.e., torque ring 23, FIG. 8, to this radius of curvature to interfit with the radii of the confronting rim peripheries 45, 46. As a result of this close interfit, the product of the radially directed forces 47, 48 and the coefficient of friction effective at their respective interfit peripheral surfaces, for each surface, is a large frictional or traction force which frictionally interlocks the wheel rims 43 and 44 and prevents any relative rotation therebetween so that the wheels 14 and 12 together act as a single traction unit notwithstanding the loading on their tires 41 and 42.

Figure 7:
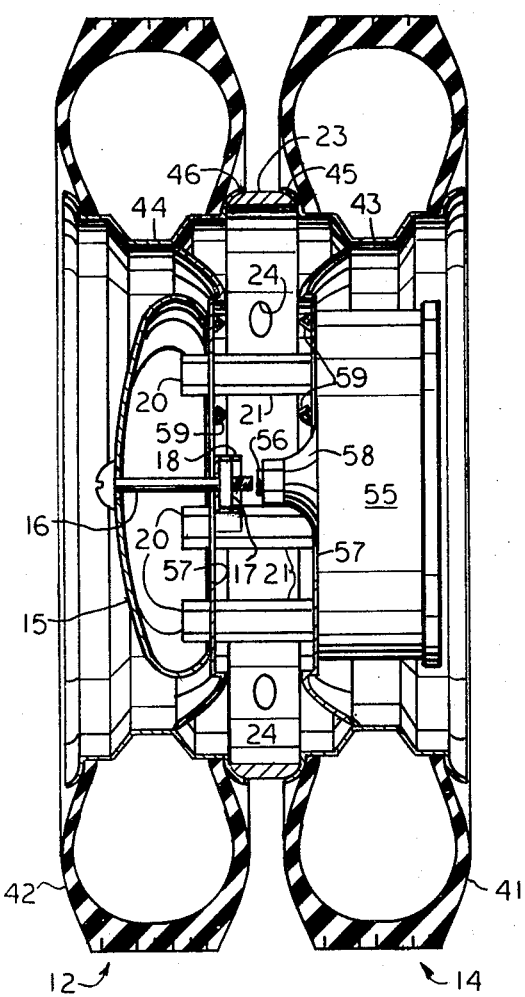
FIG. 7 is a sectional view of the dual wheel unit, somewhat enlarged, taken along the line 7—7 of FIG. 5.
Figure 8:
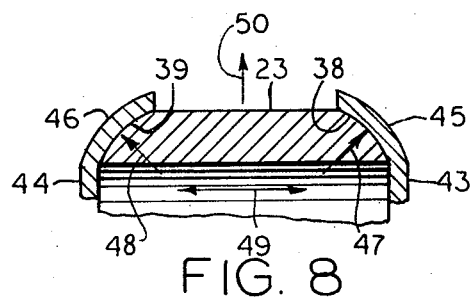
FIG. 8 is a fragmentary sectional view, somewhat enlarged showing the torque ring clamped between the confronting wheel rim peripheries and also showing the resulting radially directed forces.

The radially directed forces 47, 48, FIG. 8, are developed vectorially from the clamping forces 49 and the spring and centrifugal forces 50. The clamping forces 49 are developed when the stock fasteners 20 are threadedly engaged with the stud-nut adaptor extenders 21 to secure the outer wheel rim 44, FIG. 7, to the inner wheel rim 43.

The spring force 50 results from the fact that the resilience of the torque rings is such that each ring is readily compressed by hand to bring its ends 36, 37 together so that the ring may be moved with a snap action into a rim periphery, i.e., the movement of ring 23 into the rim periphery 45 of wheel rim 43, as shown in FIG. 3. As may be noted in FIG. 3, once it is seated on rim 43, ring 23 may open somewhat as depicted by the small spacing 35' between its ends. In some cases it is necessary to file the ends to effect an easy snap action and interfitting engagement of the parts. Similarly, a rim periphery, i.e. rim periphery 46 of wheel rim 44, may be moved with a snap action onto ring 23 as the same compresses, as required, to fully seat the peripheral rounded side 39 of ring 23 into the interfacing peripheral surface of rim periphery 46.

The ring, yieldably compressed as aforedescribed, tends to open to thus produce the spring force 50, FIG. 8. Similarly, the ring being open-ended, tends to further open in response to centrifugal forces thereon developed as a function of the speed of rotation of the duals, hence the developed centrifugal force 50.

Figure 6A:
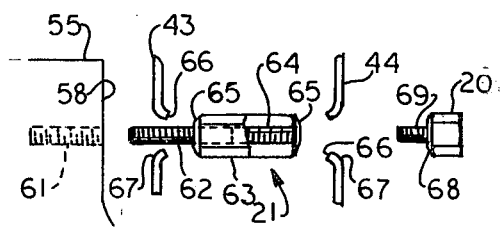
FIG. 6a is a schematic showing of the complete stud-nut wheel fastener system for one make of passenger car.

It will be seen in FIGS. 6a and 7 that wheel rim 44 is inverted relative to the normally positioned inner wheel rim 43. The wheel rims are formed in profile such that tire 41 is positioned directly over and centered with respect to the brake drum 55 to provide for efficient loading of the axle 56 by the tire 41 and wheel rim 43. The face or mounting flange 57 of wheel rim 43, however, is disposed outwardly of the central plane of tire 41 to lie against face 58 of brake drum 55 to which it is secured by the adaptor extenders 21. In view of this wheel rim profile, wheel rim 44 is inverted so that its face 57 is disposed in as closely spaced relation as possible to the face 57 of wheel 43 in order to provide an efficient loading of tire 42 and wheel rim 44 on axle 56. This, of course, has the advantage also of keeping the length of the adaptor extenders 21 relatively short. Also, consistent with the optimum spacing of tires 41 and 42, it will be apparent that the spacing between the faces 57 of wheel rims 43, 44 may be increased or decreased relative to the showing of FIG. 7.

The aforedescribed wheel rim profile apparently is typical and no exceptions are known. Hence, the need for the inversion of the outer wheel rim. It will be apparent, however, that if the outer wheel rim 44 were not inverted as it is in FIG. 7, that the adaptor extenders 21, for the same spacing of tires 41, 42, would have to be about twice as long as shown in FIG. 7. The advantage of not having to invert outer wheel rim 44 is that hub cap 15 may be secured to the stock holders 59, FIGS. 3 and 7, in the usual manner.

Figure 5:
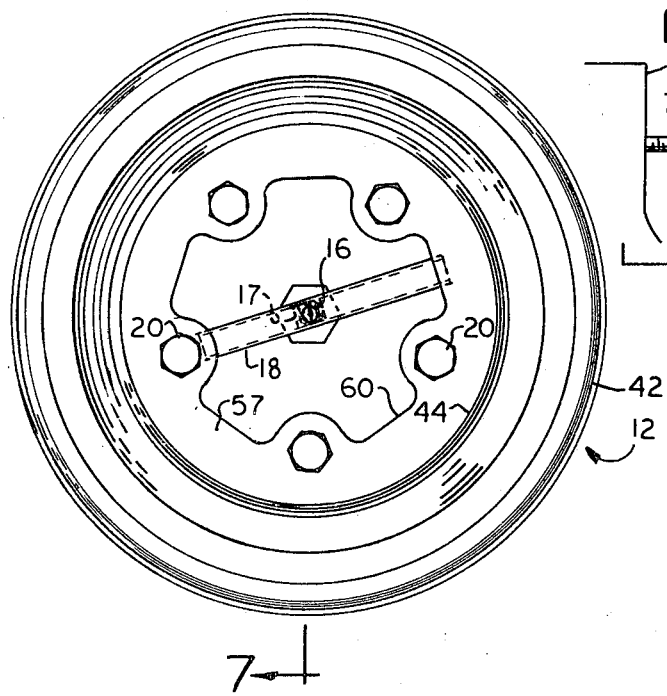
FIG. 5 is a view similar to the rear wheel showing of FIG. 3, but viewed substantially along the line 5—5 of FIG. 1 and showing the outer dual wheel in secured position on the inner dual wheel.

In the hub cap mounting arrangement disclosed in FIGS. 1, 5, and 7, hub cap 15 is secured to the mounting face 57 of wheel rim 44 by the channel 18. As best seen in FIG. 5, channel 18 is made to bridge the central opening 60 in mounting face 57 of wheel rim 44. Bolt 16 passes through aligned holes in cap 15 and channel 18 to engage a square nut 17 seated against turning in channel 18.

In mounting the hub cap, bolt 16 is first passed through the cap and channel 18 and threaded into nut 17 seated in the channel. When thus assembled to the hub cap, the cap and channel are manipulated as a unit to move the channel into opening 60, FIG. 5, and thence behind wheel mounting flange 57. Screw 16 is then tightened to firmly seat the hub cap against the mounting flange.

Reference is now directed to FIG. 6a wherein it may be seen that the brake drum 55 has tapped holes such as hole 61 which normally receives the threaded shank 69 of fastener 20 to secure wheel rim 43 against the surface 58 of the brake drum. However, for purposes of the duals conversion, as aforedescribed, the fasteners 20 are replaced by the nut-stud adaptor extenders 21 to secure wheel 43 in the same manner. Also, as aforementioned, wheel 14 need not be removed to accomplish this substitution of the adaptors 21 for the stock fasteners 20.

The adaptor extenders 21 each have a threaded shank 62 which conforms to the threaded shank 69 of fastener 20 whereby the same is readily received into the tapped hole 61. Shank 62 may be a stud, as shown, in which case it is threadedly received into the threaded central opening 64 of the elongated hex nut 63. It will be understood, however, that the adaptor extenders 21 may be machined to length, for example, from hex stock, in which case the shank 62 and nut 63 would be formed integrally and each nut-stud adaptor extender 21 would be a single unit.

Figure 6B:
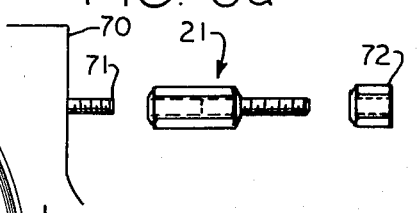
FIG. 6b is a schematic showing of the complete stud-nut wheel fastener system for another make of passenger car.

The threaded opening 64 in nut 63 receives the shank 69 of fastener 20 as well as the threaded stud 62, this threaded system being the same for all three units 62, 63 and 69. It will be appreciated that different makes of vehicles use different thread systems. For example, the threads for the Volkswagen fastener system disclosed in FIG. 6a is metric whereas the threads of the stud 71, nut 72 and adaptor 21 fastener system disclosed in FIG. 6b are U.S. Standard. It will further be appreciated that in each case the configuration of the nut-stud adaptor extenders 21 is the same, it being only necessary to assure that the thread system used meets the requirements of each make of vehicle.

Referring again to FIG. 6a, the ends 65 of nut 63 are beveled or conical shaped to conform to be beveled end 68 of fastener 20 which normally would engage the correspondingly beveled opening 66 of wheel rim 43 to provide a centering action to assure a concentric mounting of the wheel 14, all in a conventional manner. The bevel 65 on adaptor extender 21 similarly interfits with the beveled opening 66 to secure rim 43 to the brake drum 55.

The effect of the inversion of wheel rim 44 is clearly made manifest in FIG. 6a wherein it may be seen that the beveled opening 61 of inverted wheel rim 44 interfits with the oppositely beveled end 65 of nut 63 whereupon rim 44 is mounted upon and engaged in a centering action by the nut-stud adaptors 21 in the same manner as rim 43. It will be apparent that the wheel rims 43, 44 are so formed that the rim surface on the opposite side from the bevels 66 is curved, or correspondingly beveled, so that these surfaces are engaged by the correspondingly, or similarly, configured beveled surface 68 of fasteners 20 whereupon wheel rim 44 is further urged into concentric alignment with wheel rim 43 as the fasteners 20 are tightened in their threaded engagement with the adaptor extenders 21 to thus secure wheels 12 and 14 together while also clamping torque ring 23 between the confronting wheel rim peripheries 45 and 46, FIG. 8. It will be appreciated that the rounded surfaces of the torque ring in coaction with the interfaced radii of the confronting rim peripheries similarly effect a centering action as the wheels are clamped together by tightening of the fastener systems 20, 21, thereby to further assure that the wheels 12 and 14 are concentrically mounted as well as to frictionally interlock the same together against fortuitous relative rotation therebetween.

Referring now to FIG. 6b, 70 represents the brake drum or wheel hub of a different make of vehicle than that disclosed in FIG. 6a, an obvious difference being that hub 70 carries wheel mounting studs 71 for threadedly receiving the stock nuts 72 whereas hub 55 has the tapped holes 61 to receive the bolt-type fasteners 72. As aforementioned, however, the nut-stud adaptor extenders 21 are configured the same for both cases, and are the same for all vehicles, there being no known exceptions.

Figure 4:
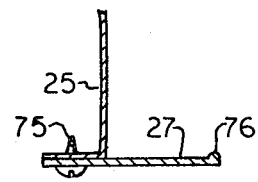
FIG. 4 is a fragmentary sectional view taken along the line 4—4 of FIG. 3.

Referring now more particularly to FIGS. 1, 3 and 4, it will be seen that the auxiliary fenders 26 and 27 are secured to the vehicle rear fenders 25 on their respective sides by metal screws 75, suitable holes being punched or drilled for this purpose in the fenders 25. The auxiliary fenders may be formed of any material suitable for the purpose such, for example, as sheet metal or plastic which readily may be formed to the contour of the fender well opening and cut, as required, or preferred, to provide the streamlining effect wherein the outer edge 76, FIG. 4, of the fender is rounded rearwardly and downwardly to merge with the vehicle bumper, as may best be seen in FIG. 1. The outer edge 76, moreover, may be formed as a bead, as shown, to provide strength and/or aesthetic value.

With reference to FIG. 3, it will be seen that the forward ends of the auxiliary fenders 26, 27 lie substantially in the vertical plane through the axis of the rear wheels. As thus constructed and arranged, the auxiliary fenders create a compressive force in the region of arrows 28 which is effective to direct road pickup debris and spray downwardly toward road level as depicted by the arrows 29.

In summary, the present invention provides a duals adaptor system and method for converting single wheel drive vehicles to duals simply by clamping an open ended torque ring yieldably, and in closely interfitting relationship, between the confronting rounded rim peripheries of the adjacently disposed and closely spaced inner and outer drive wheels whereby the wheels are frictionally interlocked together against relative rotation. The system of wheel fasteners functions to secure the wheels together, and exerts principally in tension, the clamping forces on the torque ring which develop the frictional interlock between the wheels whereby they function together as a highly efficient dual traction unit.

The installation is simple and can be accomplished in only a few minutes. Thus, for example, while the duals are advantageously used on the highways, or expressways, for safety and other reasons as hereinbefore set forth, to the car owner who prefers only to use the duals for off-the-highway excursions, he may expeditiously make the conversion for such purpose. The conversion simply entails the initial steps of elevating a rear wheel and without removing the same, replacing its stock fasteners with adaptor extenders and interposing a torque ring between it and an adjacently disposed stock wheel, preferably inverted for the purpose, and the final step of securing the wheels together, while also clamping the ring between the wheels, using for the purpose, the replaced stock fasteners.

From the foregoing it will now be apparent that a system and method of adapting and converting vehicles from single to dual traction drives has been provided which is well adapted to fulfill the objects and purposes of the invention, and that while a preferred embodiment has been disclosed for purposes of illustration herein, that other embodiments may occur to those skilled in the art without departing from the spirit and scope of the invention.

What is claimed and desired to be secured by Letters Patent of the United States is:

1. In a dual wheel adaptor system of the character disclosed for converting a vehicle of the single traction wheel type having integral arcuately concavely rounded rim peripheries and centrally located arcuately spaced fastener openings, the combination with a rear wheel of the vehicle, and an auxiliary stock wheel substantially identical to the vehicle wheel disposed in spaced adjacency therewith, an open ended torque ring interposed yieldably between the arcuately concavely rounded confronting rim peripheries of the wheels and having opposed side edges arcuately rounded to conform to the radii of the rounded confronting rim peripheries in closely interfitting relationship therewith, and wheel fastener means engageable with their fastener openings for securing the wheels together in spaced relationship while also frictionally clamping said torque ring between said rim peripheries thereof whereby the wheels are aligned concentrically and frictionally interlocked together against relative rotation therebetween, thereby to provide a unitary dual wheel traction unit.

2. In an adaptor system as in claim 1, said wheel fastener means comprising adaptor extenders for securing said traction wheel to the vehicle in the same manner as and in replacement of its stock fasteners, and the replaced stock fasteners for securing the auxiliary wheel to the adaptor extenders.

3. In an adaptor system as in claim 2, said adaptor extenders having beveled end surfaces for engaging correspondingly beveled fastener receiving holes in the mounting flanges of the wheel rims.

4. In an adaptor system as in claim 3, each said adaptor extender comprising a stud portion and a threaded nut portion.

5. In an adaptor system as in claim 1, said combination being additionally installed with respect to a traction wheel on the opposite side of the vehicle and said combinations including auxiliary fenders for covering laterally extending portions of the tires on the auxiliary wheels.

6. In an adaptor system as in claim 1, said auxiliary wheel being inverted, the stock hub cap being removed from said traction wheel, and said combination including means for securing said hub cap to the auxiliary wheel.

7. In an adaptor system as in claim 6, said hub cap securing means comprising a channel member disposed on the inner face of the mounting flange of the auxiliary wheel rim, a nut seated against turning within said channel member, and a threaded bolt which passes through the hub cap and channel member to engage said nut.

References Cited

UNITED STATES PATENTS

| | | | |
|---|---|---|---|
| 1,327,607 | 1/1920 | Baker | 301—36 |
| 3,068,049 | 12/1962 | Smith | 301—36 |
| 1,904,081 | 4/1933 | Pratt | 301—36 UX |
| 1,738,682 | 12/1929 | Baker | 301—36 |
| 1,825,344 | 9/1931 | Fageol | 280—152 |
| 2,249,568 | 7/1941 | Shinliver | 301—37 SC X |
| 1,721,278 | 7/1929 | Nelson | 301—36 |

RICHARD J. JOHNSON, Primary Examiner

U.S. Cl. X.R.

301—38 R